United States Patent [19]

Rodenbeck

[11] Patent Number: 4,586,667
[45] Date of Patent: May 6, 1986

[54] FLYER METHOD

[75] Inventor: Philip G. Rodenbeck, Fort Wayne, Ind.

[73] Assignee: General Electric Company, Fort Wayne, Ind.

[21] Appl. No.: 200,797

[22] Filed: Oct. 27, 1980

[51] Int. Cl.[4] .................. H02K 15/04; H01F 41/12; B65H 81/06; B65H 59/12

[52] U.S. Cl. .................. 242/7.03; 140/92.1; 242/7.13; 242/7.14; 242/153

[58] Field of Search .............. 242/7.03, 7.13, 7.14, 242/7.05 B, 82, 83, 153, 154, 47.01, 7.09; 140/92.1

[56] References Cited

U.S. PATENT DOCUMENTS

| | | | |
|---|---|---|---|
| 2,833,491 | 5/1958 | Carroll | 242/154 |
| 2,905,401 | 9/1959 | Ewald | 242/7.14 |
| 3,083,924 | 4/1963 | Vossen et al. | 242/154 |
| 3,793,864 | 2/1974 | Ferrentino | 242/82 |
| 3,810,587 | 5/1974 | Muskulus | 242/7.13 |
| 3,864,188 | 2/1975 | Grawley et al. | 242/4 BE |
| 3,964,525 | 6/1976 | Arnold et al. | 140/92.1 |
| 4,296,784 | 10/1981 | Rodenbeck et al. | 140/92.2 |

Primary Examiner—Billy S. Taylor
Attorney, Agent, or Firm—Ralph E. Krisher, Jr.

[57] ABSTRACT

The flyer mechanism includes a readily adjustable wire tensioning mechanism which is repeatably settable so that varying degrees of tension may be applied to the wire along the flyer arm. Centrifugal action is used to transfer wire flutter from a region near the coil form to a fluttering loop of wire between the tensioning mechanism and the flyer nozzle. The tensioning means are usable singly or in combination with a wire guide to control the size of the centrifugally generated loop. The flyer discharge nozzle may, in effect, be "free floating" and the attitude of each nozzle is controlled by the strand of wire extending between the form means and such nozzle. With this arrangement, the previously mentioned fluttering loop can have a maximum affect on the tension of the wire extending between the form means and nozzle. All of the features disclosed are operable for either direction of flyer rotation.

2 Claims, 5 Drawing Figures

FLYER METHOD

CROSS REFERENCE TO RELATED APPLICATIONS

This application is related in subject matter to application Ser. No. 114,880 which was filed Jan. 24, 1980, in the name of Ronald H. Brown and assigned to the same assignee as this application and now abandoned, the entire disclosure of which is incorporated herein by reference. Also related in subject matter is application Ser. No. 201,220, now U.S. Pat. No. 4,387,745, filed on the same day as this application in the name of Ronald H. Brown as a continuation-in-part of application Ser. No 114,880, and assigned to the same assignee as this application. The entire disclosure of this second Brown application is also incorporated herein by reference.

BACKGROUND OF THE INVENTION

The present invention relates generally to methods and apparatus utilized for winding coils that ultimately are used as the excitation windings of electric motors. More specifically, it relates to apparatus known as a flyer in the art and utilized for guiding and wrapping wire about a coil form means.

The above referenced Brown applications describe in substantial detail various problems encountered in winding applications. More specifically, the Brown applications discuss stabilization of wire fed to a coil form in order to reduce (if not eliminate) wire flutter, undesired crossover of turns from one coil form stage to another; and to problems associated with the "lay" of wire on a coil form.

The present invention also is concerned with the desirability of obtaining more reliable "lay" or positioning of wire on coil forms and the avoidance of undesirable wire flutter and coil form wire "crossover". The present invention is also concerned with providing improved methods and apparatus that permit rapid "fine-tuning" of winding equipment, and to permit rapid optimization of such equipment for different wire sizes, different wire or insulation materials, different stack height settings of the coil forms, and so forth.

With modern high-speed coil winding equipment for the electric motor industry, a flyer typically spins in a circular path about a multi-stage coil form and thereby generates a coil group comprising two or more coils that each comprise a plurality of turns of wire. The forms typically are made of two or more separate pieces so that they may be adjustably set to produce coil groups for motors of different axial lengths or lamination stack heights. In most cases, turns produced on the forms are oblong in shape.

In typical applications, the flyer rotates at speeds of anywhere from 1200 to 3000 rpm and the circular rotation of the flyer arm about a non-circular coil form causes extreme fluctuations (i.e. sudden and drastic changes) in the required feed rate of the wire being wrapped about the form. Such drastic fluctuations in wire feed rates cause the wire being wound on the form to be subjected, intermittently and alternately, to very high and very low tensile forces. In the absence of tension, the inertia of the wire may cause it to whip up and down or sideways and to tend to flutter between the coil form and the flyer.

As pointed out in the above-referenced Brown applications, if the flutter of wire is sufficient in magnitude it can actually cause a wire strand to be positioned on a coil form stage other than the stage intended; or it can cause a wire strand to cross over a previously generated strand and interfere with the proper movement of, or removal of, wire turns along the coil form. These problems can become particularly objectionable in the case of "shedder" or wind and shed winding equipment.

The above-referenced Brown application Ser. No. 201,220, now U.S. Pat. No. 4,387,745, filed as a continuation-in-part of application Ser. No. 114,880 discloses the use of a flyer having the nozzle thereof pointed at a fixed angle "backwards" during the winding process. In addition, that same application shows and describes, among other things, a fabricated flyer arm that permits wire to be thrown outwardly away from carbide wire guides or pulled up against such guides during a winding operation.

It would be desirable to improve the various techniques and procedures taught in the just-mentioned Brown application, and to provide still additional features.

It is, accordingly, an object of the present invention to provide a new and improved method of winding coils for electric motors and apparatus for putting such method into effect.

It is another and more specific object of the present invention to provide new and improved winding methods and flyer mechanisms which permit moving wire segments (extending between a coil form assembly and a flyer) to control the attitude of the flyer nozzle with respect to the coil form assembly, so that the flyer nozzle is virtually continuously directed along a line tangent to the moving point or points about the coil form assembly that the moving wire segment is contacting, with the ultimate result that the wire segment passing from the flyer nozzle is neither bent nor deflected by the nozzle itself.

It is still another object of the present invention to provide a new and improved winding method and flyer mechanism wherein centrifugal forces are utilized to apply a tensioning force to moving wire segments extending between a coil form and a flyer nozzle, and yet wherein centrifugal forces utilized to establish an accumulator loop of wire are restrained from throwing such accumulator or loop of wire outwardly into interfering relation with other parts of the winding equipment.

It is a further and more specific object of the present invention to provide new and improved methods and flyer mechanisms capable of carrying out the last stated object, and which also maximize the tensioning effect of the centrifugally generated accumulator loop of wire by providing a free floating flyer nozzle.

It is yet a further object of the present invention to provide an improved winding method and flyer mechanism such that reduced amounts of tension are applied to the wire in virtually all parts of the winding equipment until the wire is in close proximity to the flyer nozzle, and such that only then is more tension applied, in order to improve the wire handling capabilities of the winding equipment and improve and facilitate set up of such equipment for handling wires of different materials, different enamel coatings, and different sizes, and when making coils for stators of different stack heights.

It is a still further object of the present invention to provide new and improved winding methods and flyer mechanisms that facilitate the production of coils for electric motors by means that are conveniently and easily adjustable for purposes of optimizing the winding of coils for electric motors.

SUMMARY OF THE INVENTION

In accordance with one form of the invention there is provided a coil winding machine for producing a plurality of continuous wound coils having different coil sizes wherein such machine comprises a frame, a coil form or form assembly having a plurality of stepped turn form positions or stages of progressively increasing size, and a flyer mechanism mounted for rotation about the coil form. Machines embodying the invention and capable of practicing various aspects of the invention may otherwise include conventional and well known means for supplying wire from a wire supply to the flyer and thereupon through the flyer arm to the coil form assembly as the flyer arm rotates about the form assembly. In specifically illustrated embodiments of the invention disclosed herein, the flyer mechanism itself includes a readily adjustable wire tensioning mechanism which is repeatably settable so that varying degrees of tension may be applied to the wire along the flyer arm. In a preferred form, the flyer arm is designed so that centrifugal action will establish an accumulator or intermediate loop of wire between the tensioning means just described and the flyer nozzle. Thus, preferably, the tensioning means do not interfere with the tensioning affect of the centrifugally generated loop on the moving strand of wire that extends between the flyer nozzle and the coil form assembly.

In the most preferred forms of the present invention, the flyer discharge nozzle is in effect "free floating" and the attitude of such nozzle is controlled by the strand of wire extending between the form means and such nozzle. Because of this arrangement, the previously mentioned accumulator loop will have a maximum affect on the tension of the wire extending between the form means and nozzle.

More preferred methods and mechanisms embodying the invention are such that the design and specific structure of the flyer does not impede or negate the beneficial effects that can be obtained by utilizing a centrifugally generated wire loop for tensioning a wire segment extending between a coil form and nozzle in order to substantially reduce, if not eliminate, flutter of the wire segment extending between the coil form and flyer nozzle. Furthermore, the success of such methods and mechanisms is not dependent on unidirectional operation of the flyer.

A specific form of the invention illustrated herein includes methods and means for tensioning wire so that optimized winding procedures may quickly be established with any given winding machine with a relatively non-complicated and straightforward mechanism. As a final point, it is noted that utilization of various aspects of the present invention, (e.g., the feature of utilizing a wire strand extending between a coil form and flyer to establish the attitude of the flyer with respect to the form) may be used to great benefit in improved winding machine performance even when other features discussed hereinabove in general (and in detail hereinbelow) are not utilized.

The subject matter which is regarded as my invention is particularly pointed out and distinctly claimed in the concluding portion of this specification. The invention itself, however, both as to its organization and methods of operation, together with further objects and advantages thereof, may best be understood by referring to the following detailed description taken in connection with the accompanying drawings.

BRIEF DESCRIPTION OF THE DRAWINGS

FIG. 4 is a view of a portion of the structure shown in FIG. 2, but with various parts shown in section and other parts removed in order to illustrate details of the flyer arm structure shown therein and to enhance an understanding of the operation of a tensioning mechanism illustrated thereby.

DESCRIPTION OF THE PREFERRED EMBODIMENTS

Figure 1:
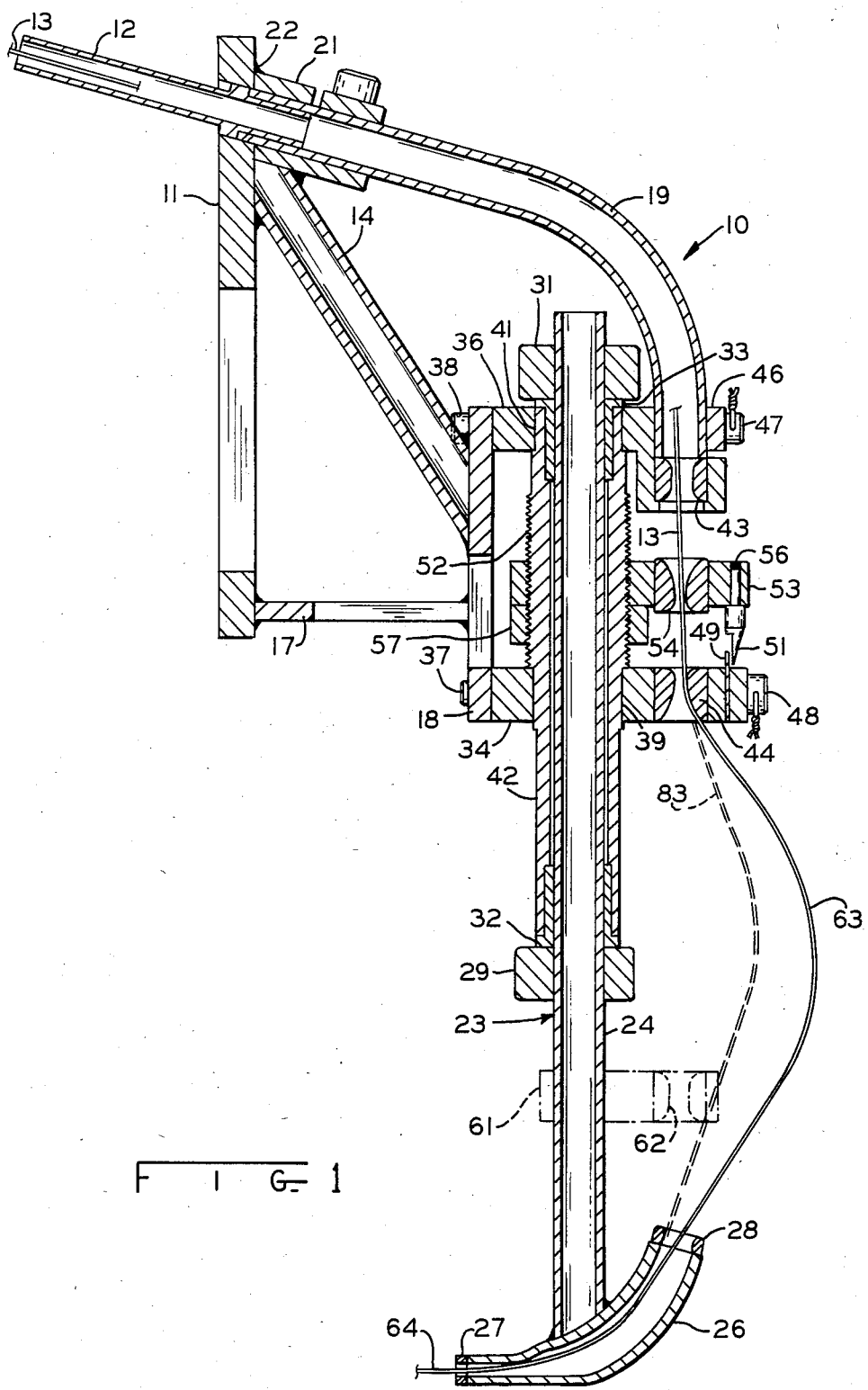
FIG. 1 is a side elevation, with parts removed, parts in section, and parts broken away of that portion of a winding machine in the vicinity of the flyer mechanism; and this figure illustrates in detail the arm of a new and improved flyer arm mechanism embodying the invention in one specific form and with which features of the present invention may be practiced.

Referring now to FIG. 1, there is illustrated winding apparatus having a very substantial portion thereof removed and broken away in order to make applicant's contributions to the art more readily apparent. The portion of the overall winding apparatus that is illustrated in FIG. 1 includes a flyer arm assembly 10 which is attached to the flyer of any winding machine that is to benefit from the principals taught herein.

Figure 2:
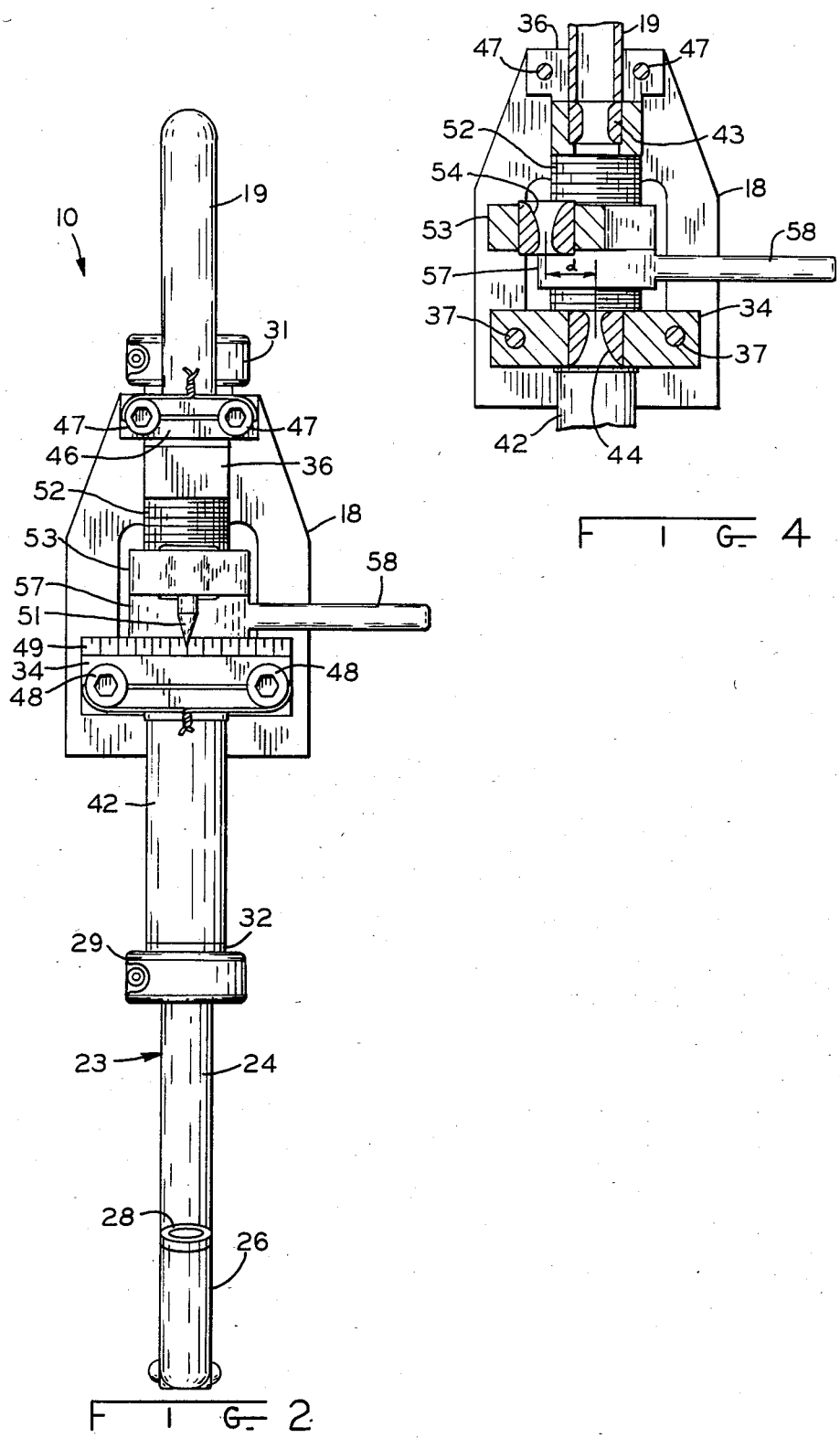
FIG. 2 is a right-hand side view of the structure illustrated in FIG. 1, with parts omitted to avoid confusion, and assuming that FIG. 1 is shown in full.
Figure 3:
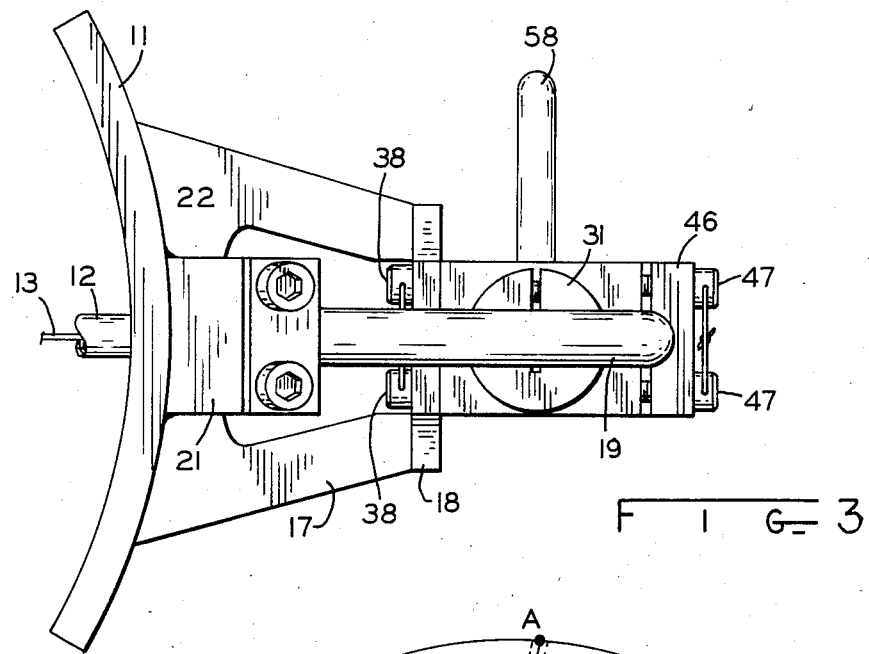
FIG. 3 is a top view, with parts removed and parts broken away, of the structure shown in FIG. 1.

For example, an overall perspective view of a winding machine is shown in both the above referenced Brown applications and also in the commonly assigned Arnold et al U.S. Pat. No. 3,964,525 of June 22, 1976. FIG. 2 of the just-mentioned Arnold et al U.S. Pat. No. '525 illustrates in great detail the winding head portion of such apparatus, and a "flyer drum 67" in the Arnold et al Patent has attached thereto a flyer arm or "flyer 13". The entire disclosure of this Arnold et al patent is incorporated herein by reference.

It will be understood by persons of ordinary skill in the art that the mounting plate 11 of the assembly 10 shown in FIG. 1 herein is fastened by means of bolts (preferably) or optionally by means of welds to the flyer drum of the apparatus utilizing the present invention. Thus, the mounting plate 11 and all of the structure attached thereto rotates with the flyer drum (such as drum 67 in the Arnold et al patent) during a winding operation. The wire that is used during the winding process is conventionally fed from a drum or spool supply located externally of the machine through one or more tensioning guides or eyelets and for a distance of perhaps five to six feet down through the machine and ultimately into the wire tube extension 12 of FIG. 1. Segments of such wire 13 are generally denoted herein by the reference numeral 13.

With attention now being confined to the flyer arm assembly 10 specifically illustrated herein, it will be noted that a tube brace 14 and a lower brace 17 interconnect the mounting plate 11 with a mounting plate 18. The braces 14 and 17 are welded to the mounting plates 11 and 18 in order to form a rigid structure capable of rotation at speeds up to, for example, of 3000 rpm.

In order to interconnect the wire tube extension 12 and the flyer wire tube 19 a clamp block 21 is provided and the tube extension 12 and tube 19 interfit with one another within the block 21 as clearly revealed in FIG. 1. The clamp block 21 is rigidly fastened to the mounting plate 11, for example with a weld 22. It will be noted that the brace tube 14 braces not only mounting plate 18 with respect to the mounting plate 11, but also braces the clamp block 21 with respect to the mounting plates 18 and 11.

With reference now to the portion of the flyer arm assembly shown in the lower part of FIG. 1, a pivot tube assembly 23 will now be described. The assembly 23 includes a pivot tube 24 and an end tube or nozzle 26 which is made from three-eighths of an inch diameter tubing.

The end nozzle 26 is flattened and formed as illustrated in FIG. 1, and conventional carbide or other hard wire guides 27, 28 are fastened at the ends thereof by silver soldering. It will be understood that there are numerous commercial sources of hardened wire guides, but it is noted for purposes of disclosure that the guides 27 and 28 preferably are made from tungsten carbide material available in the trade as "CARBOLOY" material from the General Electric Company.

The pivot tube assembly 23 further includes a lower clamp 29 and an upper clamp or collar 31. The clamps 29, 31 are tightly fastened to the pivot tube 24 which is rotatably suspended in a pair of bushings 32, 33. Thus, the pivot tube assembly 23 may rotate freely within the bushings 32, 33. The reasons for permitting the pivot tube assembly 23 to be rotatable will be discussed in detail hereinbelow but first the remainder of the flyer arm assembly 10 illustrated in FIGS. 1–4 will be described.

A review of FIG. 1 will reveal that a lower clamp plate 34 and upper clamp plate 36 are each fastened by means of socket head cap screws 37, 38 to the mounting plate 18. Among other things, each of these clamp plates includes a centrally located bore 39, 41 respectively, which accommodates spaced apart portions of a sleeve 42. The upper and lower clamp plates also include outer bores in which carbide wire guides 43, 44 are silver soldered. As will be appreciated from a reference to FIG. 4, the guides 43, 44 are vertically aligned with one another and wire 13 passes downwardly past these two guides during a winding operation. The upper clamp plate 36 does differ from the lower clamp plate 34, inter alia, by the provision of a clamping portion 46 which holds the wire tube 19 in alignment with the wire guide 43. Socket head cap screws 47 thus releasably hold the tube 19 in place. The lower clamp plate 34 differs, inter alia, from the upper clamp plate in that screws 48 clamp a scale 49 in position. Thus, the relative position of a pointer 51 with respect to the scale 49 may be quickly established.

The previously mentioned sleeve 42 is counterbored at the ends thereof to accommodate the bushings 32, 33. Sleeve 42 also has a central portion 52 threaded, and is shouldered so that it will be trapped in a fixed axial position between the upper and lower clamp plates 34, 36. Manually threaded onto the threaded portion 52 of the sleeve 42 is a tension plate 53 which carries yet another carbide wire guide 54 and the previously mentioned pointer 51, both of which are silver soldered to plate 53. The axial positioning of the wire guide 54 between the guides 43, 44 is not critical, but for convenience the guide 54 is positioned approximately midway between the guides 43 and 44. However, it will be noted (particularly from FIG. 4) that the tension plate 53 may have its circumferential position with respect to sleeve 42 changed manually. This is done in order to establish any desired degree of offset "d" from a line passing through the center of the eyelets 43, 44. The amount of the offset "d" can be readily established for reference purposes as one, two, three, etc. "units" to the right or left of center on the scale 49 as viewed in FIG. 2. In order to avoid confusion, it is pointed out at this time that the eyelet 54 is shown in two different relative positions (with respect to the remainder of the structure) in FIGS. 2 and 4, respectively.

The offset or circumferential position that is manually set for the wire guide 54 (by manually turning the tension plate 53 on the threaded portion of the sleeve 42) is locked by a locknut 57 having a handle 58. Thus, when it is desired to change the alignment (or degree of offset) of wire guide 54 with respect to the wire guides 43, 44 and thus change wire drag or tension; it is necessary only to manually loosen the locknut 57, manually reposition the tension plate 53 so that the pointer 51 will be aligned with any desired indicia on scale 49, and thereafter hold tension plate 53 in its desired position while manually retightening the locknut 57.

An additional pivot clamp 61, shown in phantom in FIG. 1, may be used if desired. If the pivot clamp 61 is used, it may be positioned axially along the pivot tube 24. Wire 13, passing from wire guide 44 into wire guide 28 may then be threaded through the eyelet or wire guide 62. During rotation of the flyer arm assembly 10, centrifugal forces will tend to throw a loop 63 of wire radially outwardly in the region between the wire guides 44 and 28. The wire is not, however, flung freely outwardly (i.e., to the right as viewed in FIG. 1) due to the fact that a segment 64 of the wire is actually being wrapped about a coil form assembly. The average size of this accumulator loop may be controlled not only by varying the tension at guide 54 (FIG. 4); but also by using guide 62 and changing the position thereof along tube 24.

Figure 5:
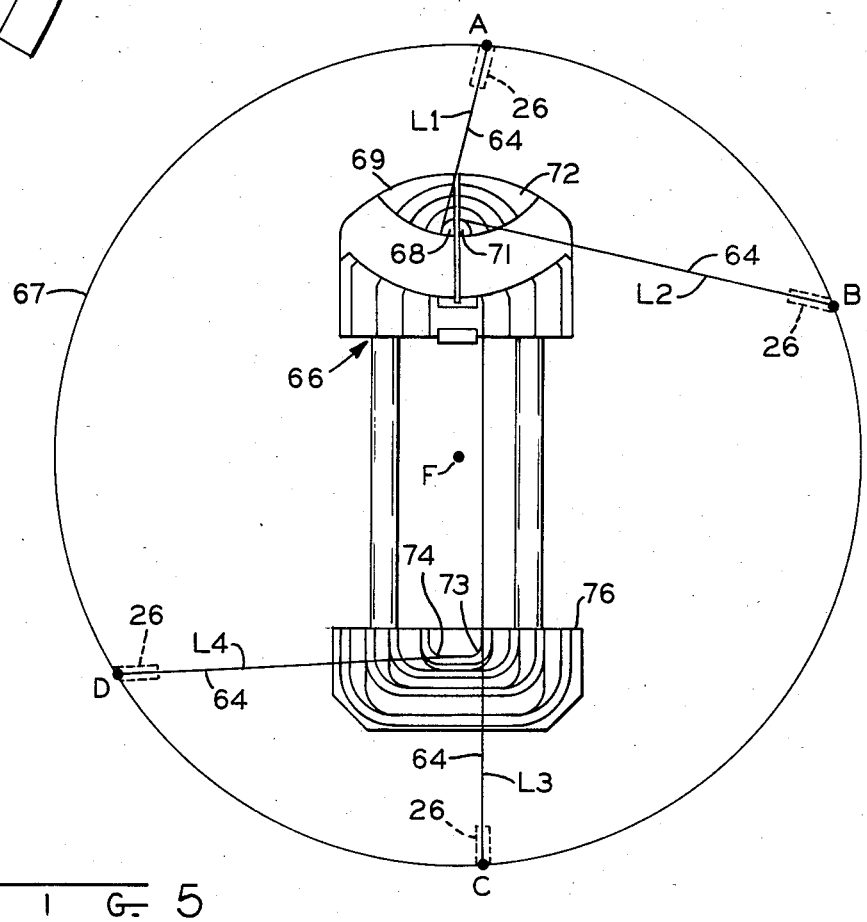
FIG. 5 is a somewhat schematic representation of the movement of the flyer arm of FIG. 1 as it moves about a coil form assembly carried by the winding machine incorporating such flyer.

FIG. 5 clearly illustrates coil form assembly 66 of the winding apparatus disclosed herein and nozzle 26 at different positions. A circular trace 67 in FIG. 5 represents the path followed by the center of pivot tube 24 (and thus nozzle 26) during one flyer revolution during a winding operation.

FIG. 5 thus reveals the instantaneous position and location of nozzle 26 with respect to the coil form assembly 66 at four instantaneous points A, B, C, and D. At point A the wire segment 64 is extending tangentially from its point of contact with the winding stage 68 of form section 69. At this instant, due to the tension in the wire segment 64, the wire segment itself forces the nozzle 26 into alignment with itself, and thus a line extending from the point of wire contact with the winding stage 68 to the path 67 at point A.

At a later point in time, with movement of the flyer in a clockwise direction as viewed in FIG. 5 to point B; the wire segment 64 will extend tangentially from its point of contact with the winding stage 71 (of form section 72) to the point B on path 67. At this instant, the nozzle 26 is forced into alignment with the then existing position of wire segment 64. Thus, the position or relative attitude of the nozzle 26 with respect to the coil form assembly 66 continues to be modulated and determined by the wire segment 64.

At a later instant in time just prior to the instant when the wire segment 64 will start to wrap about the corner 73 of winding stage 74 (of coil form section 76), the attitude of nozzle 26 (when at point C) with respect to the coil form assembly 66 is still determined by the wire segment 64.

Thereafter, at an instant in time corresponding to a positioning of wire nozzle 26 at point D, the attitude of nozzle 26 with respect to the form assembly is determined by the wire segment 64 positioned against the flattened end portion of stage 74.

It will be understood that the flyer arm assembly 10 in reality is generally rotating about the coil form assembly 66 at speeds that may peak at anywhere from 800 revolutions per minute to over 2000 revolutions per minute; and the points A, B, C, and D in FIG. 5 have been chosen arbitrarily purely for purposes of discussion. Moreover, it will be understood that the attitude of the nozzle 26 with respect to the coil form assembly 66 will be continuously changing during each fraction of a degree of revolution of the nozzle 26, and thus pivot tube 24 continually turns in its bushings as it moves along the path 67 about the form assembly.

For purposes of discussion, it will be assumed that the actual increment of wire wrapped about the coil form stage 68-71 during movement of the flyer arm nozzle 26 from point A to point B will actually be one inch of wire. Similarly, and strictly for purposes of discussion, it will be assumed that two inches of wire are actually wrapped about the coil form assembly 66 during the period of time that the flyer is moving from point C to point D in FIG. 5. Furthermore, and strictly for purposes of discussion, it now will be assumed that 18 inches of wire are actually laid against the coil form 66 during the period of time that the flyer arm is moving from point B to point C in FIG. 5.

Thus, during the time that the flyer moves from point A to point B, the actual length of wire that will be fed out of nozzle 26 will be a wire length equal to: L2 (the distance between point B and a point on stage 71 the wire segment 64 is contacting such stage) minus L1 (the distance between point A and the point on winding stage 68 in contact with wire segment 64), plus one inch (the amount of wire that it is assumed was wrapped about the coil form assembly during movement of the flyer from point A to point B).

It is now assumed for purposes of discussion that the length L2 is 18 inches; and it is now assumed for discussion purposes that the length L1 is nine inches. Thus the actual length of wire pulled out of the nozzle 26 while the flyer traverses from point A to point B would be:

L2−L1+1=ten inches of wire

On the other hand, while traversing from point B to point C, and placing the previously assumed 18 inches of wire against the form assembly 66, the actual amount of wire fed from the nozzle 28 would be 18 inches (the amount of wire wrapped on the form) plus L3 (the amount of wire extending from point C to the point of contact of the form) minus L2 (as defined hereinabove).

For purposes of discussion, it is now assumed that the length L3 is six inches. Thus during the time that the flyer traverses from point B to point C, a length of wire equal to:

L3−L2−18=fifteen inches of wire will have been pulled from the nozzle 26.

For purposes of discussion, it is now assumed that the length L4 of wire is seven inches, and by analogy to the discussion just presented, during the time that the flyer moves from point C to point D, three inches of wire will have actually been pulled from the nozzle 26.

The actual angular separation between points A, B, C, and D could, of course, be accurately scaled, but for purposes of discussion it is now approximately taken that the angle from points A to F to B is 64°; that the angle from B to F to C is 109°; and that the angle from C to F to D is 61°.

By using the above assumed dimensions and speeds, and calculations; it is calculated that the average feed rate of wire, in inches per degree between points A and B, would be 0.15625 inches of wire per degree; thus, between the points B and C the feed rate would be 0.13761 inches of wire per degree; and between points C and D the feed rate would be 0.04918 inches of wire per degree. These feed rates may be converted to inches per minute by assuming the speed of the flyer to be 1500 revolutions per minute which is equal to 540,000 degrees per minute. Thus, the average feed rate of wire, in inches per minute, between points A and B would be 84,375 inches per minute or roughly 7000 feet per minute. Similarly, between points B and C the approximate wire feed rate out of nozzle 26 would be about approximately 74,309 inches per minute or 6200 feet per minute; and the average wire feed rate between points C and D would be approximately 26,557 inches per minute or 2200 feet per minute. Converting these figures to approximate speeds in miles per hour, the relative speed rates for the feed rates of the wire would be, respectively, approximately 80 miles per hour, 70 miles per hour, and 25 miles per hour.

It should now be appreciated that during part of each revolution of the flyer (which occurs in one twenty-fifth of a second at a speed of 1500 rpm), the actual feed rate of wire being dispensed from the nozzle 26 can be at speeds of 80 miles per hour or more, while during other parts of each revolution the actual wire feed rate can be as low as 25 miles per hour.

Thus, during each revolution of the flyer, a given moving segment of wire on the discharge or outlet size of nozzle 26 (i.e., extending for example between the eyelet 28 of the nozzle 26 and the point of contact with the form) will either be accelerating or decelerating at a relatively rapid rate. At the time that such wire segment is accelerating (i.e., as the demand for wire is increasing per degree of rotation of the flyer) increased tension is placed upon such wire segment itself, and back through the wire supply. On the other hand, when the wire feed rate is decelerating, the tension tends to decrease, and inertia of the wire tends to cause the wire to flutter between the coil form and wire nozzle. However, use of the present invention transposes or transfers such wire flutter from the discharge side of nozzle 26 to the inlet (or wire admitting) side or end thereof.

With all of the above in mind, reference is now once again made to FIG. 1. In FIG. 1 it will be seen that a loop of wire extending between eyelets or wire guides 28 and 44 has been identified by the reference numeral 63 and that the same loop, somewhat reduced in quantity has been shown in phantom and identified by the reference numeral 83. When using the apparatus as illustrated in FIG. 1, and at such time that a maximum feed rate of wire is being demanded (for example, during the interval that the flyer pivot tube 24 is moving from position A to position B in FIG. 5); the wire extending between wire guides 44 and 28 will tend to be thrown outwardly as represented by the phantom line position 83 wire loop. However, as the flyer moves from position B to position C as represented in FIG. 5 and the linear feed rate of wire or demand for wire from nozzle 26 is somewhat diminished, the tension on the wire between the nozzle 26 and the form 66 will be somewhat diminished. During this interval from B to C, the inertia of the wire moving downwardly through the wire tube 19 and past the wire guides 43, 54, and 44 will tend to throw additional wire into the wire loop between eyelets 44 and 28; and the wire loop will tend to be flung outwardly by centrifugal action. In fact, this centrifugal action effect will tend to pull wire out of the wire guide 44 and also of course increase the tension on the wire exiting from the nozzle 26 by trying to pull wire in a reverse direction past eyelet 28.

In any event, during the time that a minimum feed rate of wire occurs (for example during interval C to D in FIG. 5), a maximum size loop (as indicated at 63 in FIG. 1) of wire between guides 44 and 28 will be thrown. Subsequently, as a rapidly increasing demand for wire is made upon the supply as the flyer moves back into a region of high wire feed rate demand; the loop of wire 63 (which momentarily previously had served as a tensioning and accumulation means) becomes a source of an intermediate accumulated supply of wire to meet the rapidly increasing demand without requiring quite as rapid acceleration of the wire coming through wire tube 19. Thus it should now be understood that when the structure as illustrated in FIG. 1 is illustrated, the wire within wire tube 19 will tend to have the maximum and minimum speeds thereof reduced, or averaged out. This occurs because the increasing and decreasing size of the wire loop tends to maintain a steady flow rate of wire from the guide 44; and when peak demands are made for wire at nozzle 26, the wire loop tends to supply such peak demand. It thus should be understood that the free and totally unconfined segment of wire between wire guides 44 and 28 in FIG. 1 in effect constitutes a "fluttering" demand leveling or load leveling wire loop. It should now be appreciated that use of the more preferred aspects of the present invention results in transferring the unwanted variable speed and inertia induced "flutter" of wire from one side of a wire discharge means to the other, inlet side thereof; and then utilizing such flutter phenomena to advantage in order to smooth out the wide fluctuations in demand made on the wire supply at a remote point. However, it also should be apparent from FIG. 1 that the structure detailed in FIG. 4 plays an important part in the successful implementation of my preferred methods.

It should be readily appreciated that once the mechanism shown in FIG. 1 has been designed and adjusted to handle a relatively heavy wire that is going to be wound at a given winding speed; an increase to a higher winding speed will tend to increase the size of the wire loop 63 and thus tend to increase the amount of tension put on the wire extending from the nozzle 26 to the form assembly 66. Alternatively, a decrease in winding speed from the design winding speed may cause a sufficient lessening of material in the loop 63 (and corresponding lessening of tension on the outlet side of the nozzle 26) to create winding problems. Similarly, even if the winding speed were to be held constant, if wire of a different size or different stiffness were to be handled, the limits of the loops 63 and 83 may well not be optimum for the initial machine set-up.

The apparatus illustrated in FIGS. 1-4 herein was devised with the difficulties just suggested in mind; and the flyer arm assembly 10 may be quickly and easily fine-tuned or adjusted for differing winding speeds, wire materials, and wire sizes. Thus, the tension placed upon the wire going into the inlet side of the loops 63, 83 and indeed the limits on the maximum and minimum sizes of the loop may be readily adjusted by adjusting the tension (or frictional drag) applied to the moving wire segment that instantaneously occurs between the wire guides 43 and 44.

With reference now to FIG. 4, this variable tension will be explained. It will be noted that when the wire guides 43, 54, 44 in FIG. 4 are all in alignment one with another only some slight frictional drag will occur due to the wire moving past the wire guides. However, when the speed of the winding machine is changed or the winding material is changed with the result that increased wire tension is needed, the locknut 57 is loosened manually with handle 58. Then the tension plate 53 is adjusted to establish a sufficient offset dimension d between the wire guide 54 and the wire guides 43 and 44 so that additional tension will be applied to the wire as measured at the outlet of wire guide 44 and so that a proper winding action and development of wire loops 63, 83 will result. Somewhat surprisingly, with the arrangement illustrated herein, it has now been found that substantially less tension needs to be applied at the wire drum or spool or other initial source of wire being fed into the winding apparatus. This of course results in less overall tension and stress being applied to the wire and it is accompanied with a concomitant reduction in the potential for damaging the wire by unduly stretching it (such damage being manifest either in increased resistance of the wire or damage to the enamel insulation coating on the wire) during the six feet or so that the wire must travel from the spooled supply to the wire tube 19.

Since the wire loop extending between the guides 44 and 28 is completely unconfined and in normal operation cannot come in contact with any type of guide or eyelet, wire wear or damage is substantially avoided in the fluttering loop 63, 83 and thus improved coils may be expected to be produced. Improved coil conditions also may be expected to result from the fact that the pivot tube 24 is free to pivot and that the attitude of the nozzle 26 is virtually continuously modulated or altered (vis a vis a radial line drawn from the location of the pivot tube 24 on the path 67 and directed to the center F of the form assembly). This continuous modulation or adjusting of the attitude pivot tube 24 tends to assure that the wire tension that exists between the outlet of the nozzle 26 and the point of contact with the form is very close to the same tension that exists at the inlet side of the wire guide 28 (i.e., in the loop 63, 83).

Since the nozzle 26 is virtually continuously and infinitely adjustable, in response to the needs of the wire being wrapped about the coil form assembly 66, it should be appreciated that, in essence, there will be no time at which a wire segment 64 (see FIG. 5) will be forced to make a sharp bend at the exit wire of nozzle 26. This results in a smoother flow of wire and a reduced tendency to force the wire to bend at the nozzle outlet which would otherwise occur if the nozzle 26 had a fixed attitude (even if it were a trailing attitude) with respect to the coil form assembly 66.

Another benefit of modulating the attitude or relative orientation of nozzle 26 with the wire segment being dispensed that should now be clear to those skilled in the art, is that when it is desired to wind coils in the opposite sense (i.e., by operating the flyer so that the path 67 shown in FIG. 5 is generated in a counterclockwise rather than a clockwise direction); the flyer arm assembly 10 will wind coils just as smoothly and handle wire just as adequately in the reverse rotation direction.

For some winding applications involving, for example, very soft fine wire and very high speeds, the tensioning eyelet 54 may not be able to control the loop 83-63 as much as is needed. In such cases, the auxiliary tensioning/accumulating loop controller in the form of clamp 61 and eyelet or guide 62 is utilized. Thus, the wire is fed through guide 62 before it is fed into nozzle 26; and clamp 61 is moved up or down tube 24 to effectively change the height or lineal extent of loop 63, 83 and thus further affect the maximum and minimum sizes of such loop. The clamp 61, as will be understood, thus is useful in conjunction with the mechanism of FIG. 4 in controlling the size and action of loop 63, 83.

It should now be apparent that, the inventions disclosed herein include, among others, methods of producing dynamoelectric machine winding turns with a flyer rotatable about form means; that include moving a wire discharge means of the flyer in a circular path about the form means while a wire segment extends therebetween; and controlling the attitude or orientation of the discharge means (relative to the center of the form means), with the wire segment extending therebetween.

Also disclosed are methods wherein a flyer itself includes adjustable wire tensioning means used to control wire flutter and average out wire feed rates, and such method may or may not include maintaining tension on the moving wire segment extending from the discharge means by flinging an accumulated moving loop of wire circumferentially or radially outwardly from the flyer.

It will be also understood that preferred methods disclosed herein may include, among other things, singly or in combination such steps as: preselectively adjusting wire tensioning means such as a fluttering wire loop and thereby controlling the range of sizes of the fluttering loop during a winding operation; preselectively controlling the lineal extent of a fluttering accumulated wire loop, e.g. by setting a movable wire guide for the wire in the loop at a preselectable location along the loop; and inducing the wire to flutter along a discharge nozzle inlet rather than along the nozzle inlet.

While there has been disclosed herein what at least presently is considered to be preferred embodiments of the invention in accordance with the patent statutes, changes may be made therein without actually departing from the true spirit and scope of the invention. Accordingly, the following claims are intended to cover all such equivalent variations as fall within the invention.

What I claim as new and desire to secure by Letters Patent of the United States is:

1. A method of producing dynamoelectric machine winding turns with a flyer rotatable about form means wherein the flyer includes adjustable wire tensioning means; said method including moving a wire discharge means of the flyer in a circular path about the form means while a moving wire segment extends from the discharge means to the form means; and controlling the attitude of the discharge means, with respect to the form means, with the moving wire segment extending therefrom; maintaining tension on the moving wire segment extending from the discharge means to the form means with the tensioning means and also flinging an accumulated moving loop of wire outwardly from the flyer in a region between the tensioning means and the wire discharge means of the flyer; controlling the range of sizes of the accumulated moving loop of wire during a winding operation by preselectively adjusting the wire tensioning means; and the method further including the step of preselectively controlling the extend of the accumulated moving loop of wire by setting a movable wire guide for the wire in the loop at a preselectable location along the loop.

2. A method of producing dynamoelectric machine winding turns with a flyer rotatable about form means wherein the flyer includes adjustable wire tensioning means; said method including moving a wire discharge means of the flyer in a circular path about the form means while a moving wire segment extends from the discharge means to the form means; and controlling the attitude of the discharge means, with respect to the form means, with the moving wire segment extending therefrom; maintaining tension on the moving wire segment extending from the discharge means to the form means with the tensioning means and also flinging an accumulated moving loop of wire outwardly from the flyer in a region between the tensioning means and the wire discharge means of the flyer; the method further including the step of preselectively controlling the extent of the accumulated moving loop of wire by setting a movable wire guide for the wire in the loop at a preselectable location about the loop.

* * * * *